(No Model.)

P. TRINKAUS.
METHOD OF FEEDING CARTRIDGE SHELL BLANKS.

No. 285,182. Patented Sept. 18, 1883.

Witnesses:
J. E. Clark.
P. B. Turpin.

Inventor:
Philipp Trinkaus
By R. S. & A. P. Lacey
Attorneys.

UNITED STATES PATENT OFFICE.

PHILIPP TRINKAUS, OF WEST STRATFORD, CONNECTICUT.

METHOD OF FEEDING CARTRIDGE-SHELL BLANKS.

SPECIFICATION forming part of Letters Patent No. 285,182, dated September 18, 1883.

Application filed August 3, 1882. (No model.)

*To all whom it may concern:*

Be it known that I, PHILIPP TRINKAUS, a citizen of the United States, residing at West Stratford, in the county of Fairfield and State of Connecticut, have invented certain new and useful Improvements in Devices Employed in the Manufacture of Cartridges; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention has relation to improvements in devices employed in manufacture of cartridges; and it consists in the method whereby the cartridges are conveyed from one machine to another by means of a transfer-tube; and it consists, further, in other improvements, all of which will be hereinafter described, and pointed out in the claims.

The invention has special reference to the processes in the manufacture of cartridges wherein there are employed two or more separate machines, and wherein the first machine having accomplished certain things in the preparation of the cartridge, the latter is transferred to an adjacent machine for farther formative operations.

Figure 1:
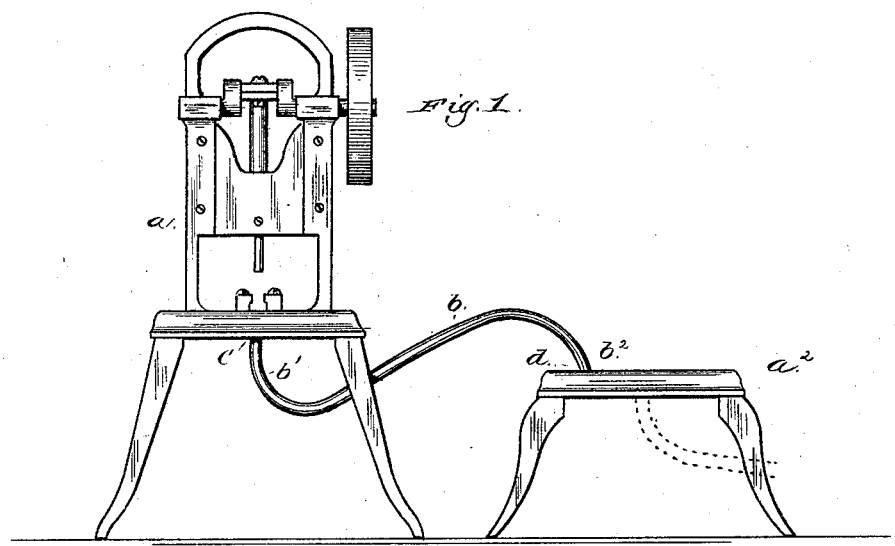
Figure 2:
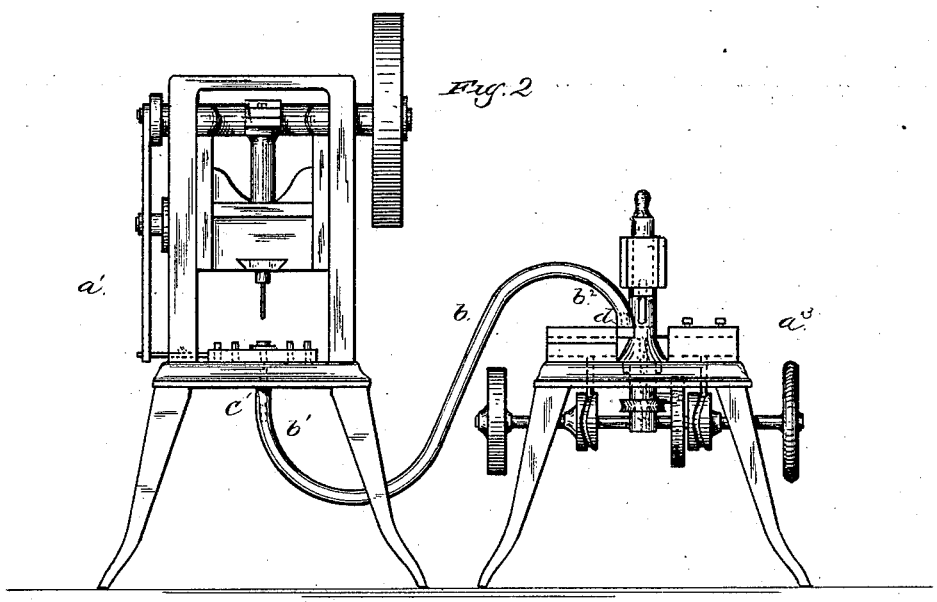

In the drawings, Figures 1 and 2 show machines employed in the manufacture of cartridges connected by a tube, as will be described.

$a\ a'$ represent drawing or swaging machines, on which the first operation in the preparation of the shells or bullets is performed, and for convenience of reference I call them the "primary machines."

$a^2\ a^3$ represent the grooving or cutting-off machines, to which the shells or bullets are conveyed after being acted upon by the primary machines, and for convenience of reference I call these the "secondary machines."

Heretofore in the manufacture of cartridges, when the shells or bullets have been shaped by the primary machines, they have been gathered and conveyed to the secondary machines, and great inconvenience has been met, owing to the fact that in delivery or feeding of the shells or bullets to the secondary machines the necessity of again arranging them in proper position would arise, or a hopper and complicated feeding mechanism would be required, and where the process of making involved the operation of several machines the operator was greatly inconvenienced by this difficulty. The labor also of conveying the shells and bullets from one machine to another was not inconsiderable and necessitated the employment of additional hands.

My invention aims to obviate this difficulty; and to this end I employ a pipe or tube, $b$, the receiving end $b'$ of which is connected to the delivery $c$ of the primary machine, and the delivery end $b^2$ of said pipe is connected to the receiver $d$ of the secondary machine, as shown. Thus in the operation of making the cartridge as the primary machines complete their work they force the shells or bullets into the tube $b$, where they are transferred to the secondary machines, and delivered thereto at the proper point and in proper position for the action of the latter machines. A constant and regular feed is thus furnished the secondary machines as the primary ones are operated, and it matters not whether the machines are on a level or higher or lower than each other, the primary machines will force the shells or bullets through the tube $b$ to the secondary machines.

The secondary machines may be connected with the joining and finishing machine by a tube, as indicated in dotted lines, Fig. 1, so that the entire operation of making can be performed without the handling of the shells or bullets by the operator.

I prefer to make the tube of rubber or other elastic material; but it will be understood a metallic tube would answer the purpose perhaps equally as well.

In practice it is advantageous to have the shells and bullets fit snugly the bore of the pipe, so that they will not turn and get clogged therein, and I provide several sizes of pipe corresponding to the different-sized dies used to make large and small cartridges.

Having thus described my invention, what I claim, and desire to secure by Letters Patent, is—

In the manufacture of cartridges wherein two formative machines are employed, the method hereinbefore described of transferring the cartridge from one machine to the next adjacent machine by means of a transfer-tube having one of its ends connected to and receiving the cartridges from the delivery of the first machine, and having its other end connected to and delivering the cartridges into the receiver of the next adjacent machine, substantially as set forth.

In testimony whereof I affix my signature in presence of two witnesses.

PHILIPP TRINKAUS.

Witnesses:
HERMAN GAUSS,
JOHN SAUR.